US005234774A

United States Patent [19]

Hasegawa et al.

[11] Patent Number: 5,234,774

[45] Date of Patent: Aug. 10, 1993

[54] NON-SINGLE CRYSTALLINE MATERIALS CONTAINING IR, TA AND AL

[75] Inventors: Kenji Hasegawa; Atsushi Shiozaki; Isao Kimura, all of Kawasaki; Kouichi Touma, Tachikawa, all of Japan

[73] Assignee: Canon Kabushiki Kaisha, Tokyo, Japan

[21] Appl. No.: 601,726

[22] Filed: Oct. 25, 1990

[30] Foreign Application Priority Data

Feb. 28, 1989 [JP] Japan .................................... 1-46769

[51] Int. Cl.[5] ........................ C22C 5/00; C22C 30/00; C22C 27/02; B32B 15/00

[52] U.S. Cl. .................................... 428/610; 428/636; 428/662; 428/670; 420/427; 420/461; 420/580

[58] Field of Search .............. 420/461, 427, 552, 580; 428/610, 636, 662, 670

[56] References Cited

U.S. PATENT DOCUMENTS

| | | | |
|---|---|---|---|
| 2,467,675 | 4/1949 | Kurtz et al. | 420/427 |
| 2,719,797 | 1/1955 | Rosenblatt et al. | 428/662 |
| 3,109,734 | 11/1963 | Bishop | 420/427 |
| 3,627,577 | 12/1971 | Steidel | 420/427 |
| 3,949,275 | 4/1976 | Muenz | 420/427 |
| 3,955,039 | 5/1976 | Roschy et al. | 420/427 |
| 4,155,660 | 5/1979 | Takahashi et al. | 420/427 |
| 4,233,185 | 11/1980 | Knapton et al. | 502/302 |
| 4,705,610 | 11/1987 | Tenhover et al. | 204/95 |

FOREIGN PATENT DOCUMENTS 96971 6/1984 Japan .

*Primary Examiner*—John Zimmerman

*Attorney, Agent, or Firm*—Fitzpatrick, Cella, Harper & Scinto

[57] ABSTRACT

There is provided a non-single crystalline material characterized by containing Ir, Ta and Al at the following respective composition rates:

28 atom percent ≦ Ir ≦ 90 atom percent,
5 atom percent ≦ Ta ≦ 65 atom percent, and
1 atom percent ≦ Al ≦ 45 atom percent.

There is also provided a member comprising a substrate and a film composed of said non-single crystalline material being disposed on said substrate.

60 Claims, 3 Drawing Sheets

PREFERABLE RANGE: (a)+(b)+(c)
MORE PREFERABLE RANGE: (a)+(b)
MOST PREFERABLE RANGE: (a)

NON-SINGLE CRYSTALLINE MATERIALS CONTAINING IR, TA AND AL

BACKGROUND OF THE INVENTION

1. Field of the Invention

The present invention relates to a novel non-single crystalline material and in particular to non-single crystalline materials containing Ir, Ta and Al as essential components. The present invention provides materials which excel in all-around strength characteristics including chemical stability, electrochemical stability, resistance to oxidation, solvent resistance, heat resistance, thermal shock resistance, mechanical durability, and adhesion, etc. The present invention relates also to a novel member comprising the non-single crystalline material and a substrate. The non-single crystalline material and member provided according to the present invention can be used effectively in various applications.

2. Description of the Prior Art

Known inorganic material (called a non-single crystalline alloy or a non-single crystalline metallic) is generally prepared by solidifying a molten blend containing component elements of predetermined amounts in admixture by cooling at an appropriate cooling rate. Frequently, the blend is also molded. The inorganic material is also sometimes prepared by uniformly mixing powdery component elements and subjecting the resultant to pressure sintering at the appropriate temperature. Further, an amorphous solid may be prepared by a quenching method in which a molten metal is quench-solidified by dropping the molten metal onto a metal plate that is maintained at a predetermined temperature while properly controlling the surrounding temperature so as to provide a high cooling rate as a whole and an aggregate may be prepared by a vacuum evaporation method in which heat-evaporated component elements are deposited on a substrate in a vacuum containment vessel.

Thus, a variety of non-single crystalline alloys can be prepared by various methods for use in various applications. These non-single crystalline alloys may be molded in ribbons, fine filaments, powders, films, bulk solids or various other forms depending upon their application.

As a specific example of the above non-single crystalline alloys, Japanese Laid-Open No. 96971/1984 discloses a Ta-Al alloy usable as a material to constitute the heat generating resistor of a liquid jet recording device. This Ta-Al alloy is worthy of attention since it may be easily prepared, may easily assume an amorphous state, has a high melting point and provides good mechanical characteristics at elevated temperature. However, the Ta-Al alloy does not satisfactorily fulfill the conditions required more recently, especially with respect to resistance against chemical and electrochemical reaction.

In recent devices, constituent members are respectively made of certain materials for use in severe environmental conditions such as repeated exposure to chemical or electrochemical reactions, strong impacts, and the like. Thus, it is required that such constituent members are resistant against such severe environmental conditions by exhibiting sufficient all-around strength characteristics including chemical stability, electrochemical stability, resistance to oxidation, solvent resistance, heat resistance, thermal shock resistance, abrasion resistance, mechanical durability, etc. Further, if the device is to be used under elevated temperature, it is required that the constituent member have a high heat resistance. Indeed, the high temperature condition exacerbates the wear problems of the chemical and electrochemical conditions and the conditions relating to mechanical strength. Because of this, it is required that the constituent member have further improved levels of all-around strength characteristics.

In addition, if the material constituting the member is to be exposed to varied temperatures of an extreme ranging from elevated to lowered temperatures for very short period of time, the foregoing complications become significant. Further, in order to protect the main body of an appliance or component, a surface thereof is applied with a material film. In this instance, it is required that the coated film have not only the foregoing all-around strength characteristics, but also exhibit a high adhesion to the main body or substrate.

Known inorganic materials do not fulfill the foregoing requirements.

In view of the above, there is an increased demand in the art for a material which sufficiently satisfies characteristics such as chemical stability, electrochemical stability, resistance to oxidation, solvent resistance, heat resistance, thermal shock resistance, abrasion resistance, mechanical durability, etc., with little noticeable variation and which has a long lifetime and can be easily prepared.

SUMMARY OF THE INVENTION

It is an object of the present invention to provide a novel inorganic material which satisfies the foregoing various requirements for the materials used for the preparation of various devices.

Another object of the present invention is to provide a novel non-single crystalline material containing iridium (Ir), tantalum (Ta) and aluminum (Al) as the essential components which excels in the all-around strength characteristics including chemical stability, electrochemical stability, resistance to oxidation, solvent resistance, heat resistance, thermal shock resistance, abrasion resistance, mechanical durability, etc. and which can be desirably used in the preparation of various devices A further object of the present invention is to provide a novel non-single crystalline material containing iridium (Ir), tantalum (Ta) and aluminum (Al) as the essential components which excels in adhesion with a substrate and can be desirably used in the preparation of various devices.

BRIEF DESCRIPTION OF THE DRAWINGS

FIG. 1(*b*) is a schematic sectional view taken along alternate long and short dash line 1(*b*) of FIG. 1(*a*).

FIG. 1(*c*) is a schematic plan view of the device wherein a layer comprising the non-single crystalline substance and electrodes are provided.

FIG. 2 is a schematic sectional view of an example of a high frequency sputtering apparatus which is used for the preparation of a film comprising a non-single crystalline substance of the present invention or the like.

DESCRIPTION OF THE PREFERRED EMBODIMENTS

The present inventors have made extensive studies on known Ta-Al alloys to achieve a novel material capable of complying with the foregoing requirements. In particular, the present inventors have prepared and investigated a plurality of materials comprising iridium (Ir), tantalum (Ta) and aluminum (Al). As a result of this investigation, it has been found that the non-single crystalline materials containing Ir, Ta and Al at a particular composition rate sufficiently satisfy all the all-around strength characteristics and can be effectively employed in the preparation of constituent members for various devices without accompaniment of unevenness in the constituent members, which constituent members can be used for long periods of time. The present invention has been accomplished based on these findings.

The non-single crystalline material according to the present invention can be an amorphous material, a polycrystalline material or a material comprising amorphous and polycrystalline materials together in a mixed state. The non-single crystalline material contains three elements, namely iridium (Ir), tantalum (Ta) and aluminum (Al) at respective composition rates of 28 to 90 atomic percent, 5 to 65 atomic percent and 1 to 45 atomic percent (these materials will be hereinafter referred to as "non-single crystalline Ir-Ta-Al substance" or "Ir-Ta-Al" alloy). The non-single crystalline Ir-Ta-Al substance is a conventionally unknown, novel substance which has been developed through experiments by the present inventors.

In particular, the present inventors selected iridium (Ir) since it is high in heat resistance and resistance to oxidation and is chemically stable, tantalum (Ta) since it exhibits a large mechanical strength and provides oxides which are highly resistant to solvents, and aluminum (Al) since it is highly workable, adheres well and provides oxides which are highly resistant to solvents. The present inventors then produced a plurality of non-single crystalline substance samples by sputtering the three elements at predetermined composition rates.

Figure 2:
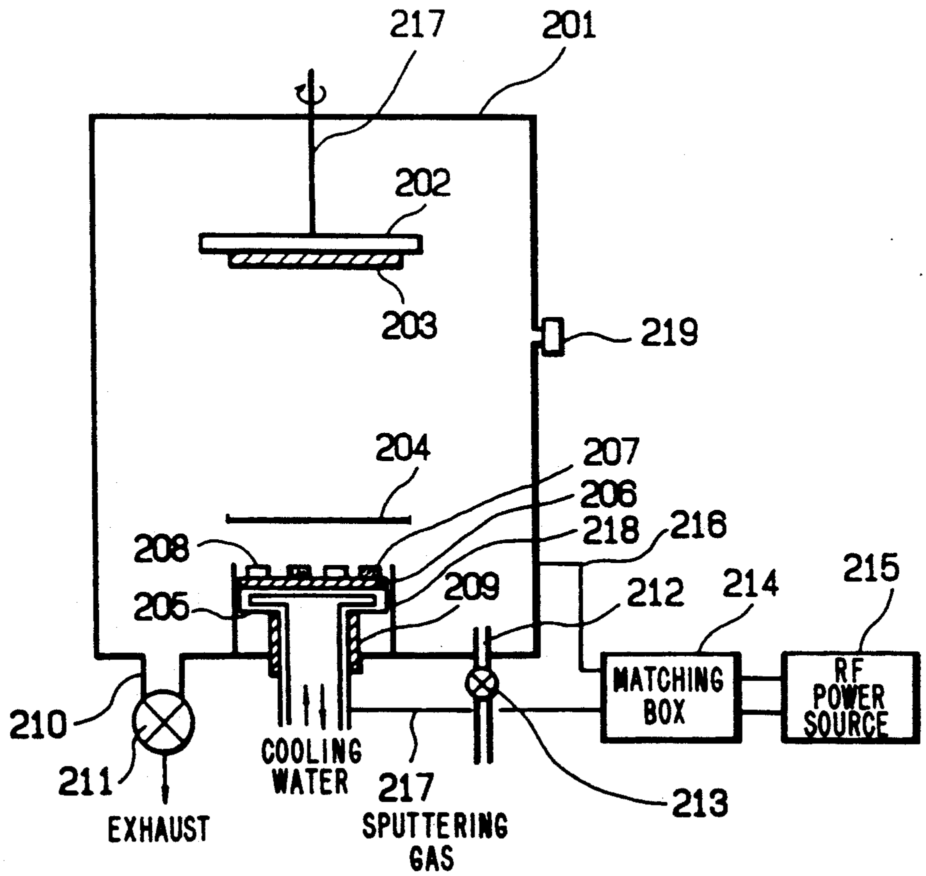

The individual samples were prepared by forming a film on a single crystalline Si substrate and a Si single crystalline substrate applied with a thermally oxidized 2.5 μm thick $SiO_2$ film to the surface thereof using a sputtering apparatus (apparatus model No. CFS-8EP, manufactured by Kabushiki Kaisha Tokuda Seisakusho) shown in FIG. 2. Referring to FIG. 2, reference numeral 201 denotes a film forming chamber and reference numeral 202 denotes a substrate holder disposed in the film forming chamber 201 for holding a substrate 203 thereon. The substrate holder 202 has a heater (not shown) built therein for heating the substrate 203. The substrate holder 202 is supported for upward and downward movement and also for rotation by means of a rotary shaft 217 extending from a drive motor (not shown) installed outside the system. A target holder 205 for holding thereon a target for the formation of a film is provided at a position in the film forming chamber 201 opposing the substrate 203. Reference numeral 206 denotes an Al target comprising an Al plate placed on the surface of the target holder 205, wherein the Al plate has a purity of higher than 99.9 weight percent. Similarly, reference numeral 207 denotes an Ir target comprising an Ir sheet with a purity of higher than 99.9 weight percent placed on the Al target and reference numeral 208 denotes a Ta target comprising a Ta sheet with a purity of higher than 99.9 weight percent placed on the Al target. Plural Ir targets 207 and Ta targets 208 each have a predetermined area and are disposed individually in a predetermined spaced relationship on the surface of the Al target 206 as shown in FIG. 2. The areas and positions of the individual Ir targets 207 and Ta targets 208 are determined in accordance with calibration curves produced in accordance with how a film which contains desired Ir, Ta and Al at predetermined respective composition rates can be obtained from a relationship of a ratio of areas of the three targets.

Reference numeral 218 denotes a protective wall for covering over the side faces of the targets 206, 207 and 208 so that they may not be sputtered by plasma from the side faces thereof. Reference numeral 204 denotes a shutter plate provided for horizontal movement such that it cuts off the space between the substrate 203 and the targets 206, 207 and 208 at a position above the target holder 205. The shutter plate 204 is used in the following manner. Prior to initiating film formation, the shutter plate 204 is moved to a position above the target holder 205 on which the targets 206, 207 and 208 are placed, and inert gas such as argon (Ar) gas is introduced into the inside of the film forming chamber 201 by way of a gas supply pipe 212. RF power is then applied from an RF power source 215 to convert the gas into plasma so that the targets 206, 207 and 208 are sputtered to remove foreign matter from the surfaces of the individual targets. The shutter plate 204 is then moved to another position (not shown) at which it does not interfere with film formation.

The RF power source 215 is electrically connected to a surrounding wall of the film forming chamber 201 by way of a conductor 216, and is also electrically connected to the target holder 205 by way of conductor 217. Reference numeral 214 denotes a matching box.

A mechanism (not shown) for internally circulating cooling water so that the targets 206, 207 and 208 may be maintained at a predetermined temperature during film formation is provided on the target holder 205. The film forming chamber 201 is provided with an exhaust pipe 210 for evacuating the inside of the film forming chamber. The exhaust pipe communicates with a vacuum pump (not shown) by way of an exhaust valve 211. Reference numeral 202 denotes a gas supply pipe for introducing sputtering gas such as argon (Ar) gas or helium (He) gas into the film forming chamber 201. Reference numeral 213 denotes a flow rate adjusting valve for the sputtering gas which is provided for the gas supply pipe. Reference numeral 209 denotes an insulating porcelain interposed between the target holder 205 and the bottom wall of the film forming chamber 201 for electrically isolating the target holder 205 from the film forming chamber 201. Reference numeral 219 denotes a vacuum gauge provided for automatically detecting the internal pressure of film forming chamber 201.

While the apparatus shown in FIG. 2 is of the form wherein only one target holder is provided, a plurality of target holders may otherwise be provided. In this case, the target holders are arranged in an equally spaced relationship on concentric circles at locations opposing the substrate 203 in the film forming chamber 201. Individual independent RF power sources are then electrically connected to the individual target holders by way of individual matching boxes. In the arrangement described above, since three kinds of targets, that is, an Ir target, a Ta target and an Al target are used, the three target holders are disposed in the film forming chamber 201 as described above and the targets are individually placed on the respective target holders. In this instance, since the predetermined RF powers can be applied to individual targets independent of each other, the composition rates of the film forming elements can be varied to form a film wherein the amount of one or more of the elements of Ir, Ta and Al is varied in the thicknesswise direction.

Individual samples were prepared using the apparatus shown in FIG. 2 under the following film forming conditions, except that each time a sample was produced, Ir targets 207 and Ta targets 208 were placed on the Al target 206 with reference to calibration curves prepared in advance for a non-single crystalline film having predetermined composition rates of Ir, Ta and Al.

| | |
|---|---|
| Substrates placed on the substrate holder 202: | Si single crystalline substrate (one piece) of a 4 inch φ size (manufactured by Wacker) and Si single crystalline substrate of a 4 inch φ size (three pieces), each having a $SiO_2$ film of 2.5 μm in thickness formed thereon (manufactured by Wacker) |
| Substrate temperature: | 50° C. |
| Base pressure: | $12.6 \times 10^{-4}$ Pa or less |
| High frequency (RF) power: | 1.000 W |
| Sputtering gas and gas pressure: | argon gas, 0.4 Pa |
| Film forming time: | 12 minutes |

Figure 3:
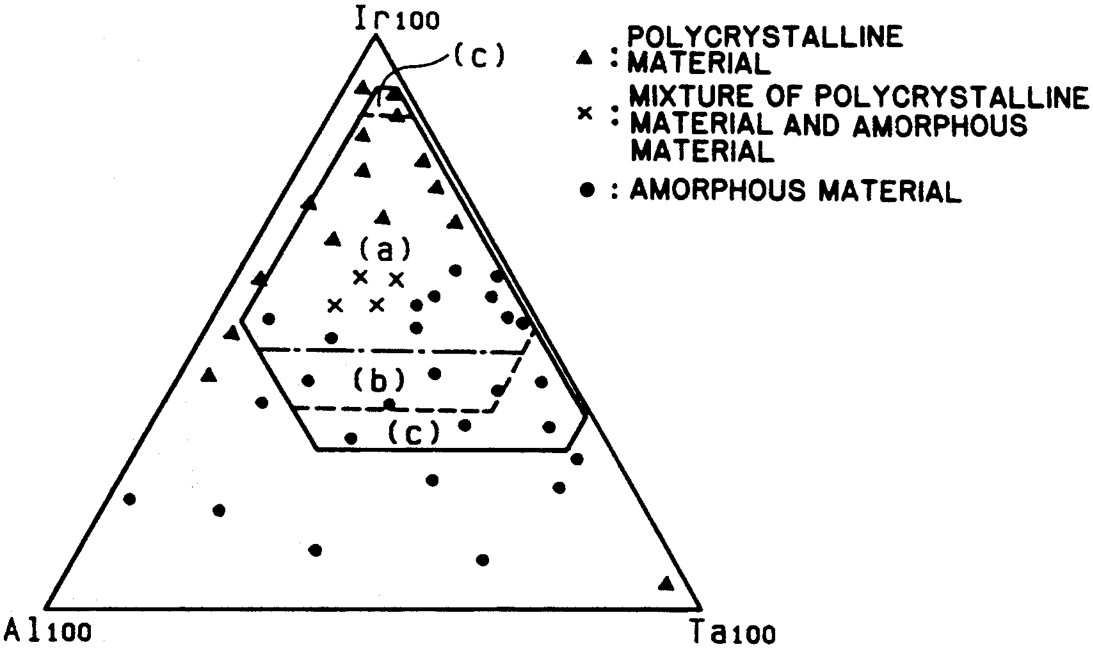
FIG. 3 is a view showing the composition ranges of non-single crystalline substances according to the present invention.

An electron probe microanalysis was performed to effect a component analysis of some of the samples obtained on a substrate with a $SiO_2$ film using a model EPM-810 analyzer (manufactured by Kabushiki Kaisha Shimazu Seisakusho) and those samples which were produced on a Si single crystalline substrate were observed with respect to crystallinity using MXP[3] X-ray diffraction meter (manufactured by Mac Science). The results are shown in FIG. 3. In particular, "▲" indicates that the sample is a polycrystalline substance; "x" indicates that the sample is a substance comprising a polycrystalline substance and an amorphous substance; and "●" indicates that the sample is an amorphous substance. Subsequently, a liquid immersion test was conducted on some of the remaining samples which were produced on a substrate with a $SiO_2$ film to observe a resistance to an electrochemical reaction and a resistance to mechanical shock, and the remaining samples which were produced on substrates with a $SiO_2$ film were subjected to a step stress test (SST) to observe heat resistance and a shock resistance in the air. The liquid immersion test was conducted using a technique similar to the "bubble resisting test in low conductivity liquid" (see analysis No. 7 of Production Example 1) except that a liquid solution comprising 0.15 weight percent sodium acetate in 70 weight parts of water and 30 weight parts of diethylene glycol was used as an immersion liquid. The SST was conducted using a technique similar to the "step stress test" (see analysis No. 8 of Production Example 1) hereinafter described.

The following results were obtained upon systematic examination of the results obtained in the liquid immersion test and the SST. In particular, it became clear (with relevance to FIG. 5) that desirable samples are those which are within the ranges of (a), (b) and (c), more desirable samples are within the ranges of (a) and (b), and most desirable samples are within the range of (a) alone. It also became clear that the most preferable samples contain a comparatively large amount of polycrystalline material, polycrystalline and amorphous material together in a mixed state, or an amorphous substance alone. Subsequently, a composition rate of Ir, Ta and Al was investigated on the samples in the overall ranges (a), (b) and (c) and it was determined that those samples contain 28 to 90 atom percent of Ir, 5 to 65 atom percent of Ta and 1 to 45 atom percent of Al. Additionally, it was determined that the samples in the more desirable ranges (a) and (b) contain 35 to 85 atom percent of Ir, 5 to 50 atom percent of Ta and 1 to 45 atom percent of Al and that the samples in the most desirable range (a) contain 45 to 85 atom percent of Ir, 5 to 50 atom percent of Ta and 1 to 45 atom percent of Al.

From the results described above, the present inventors ascertained that non-single crystalline Ir-Ta-Al substances containing Ir, Ta and Al as essential components at the respective composition rates discussed above excel in chemical stability, electrochemical stability, heat resistance, resistance to thermal shock, resistance to cavitation and resistance to erosion.

The present inventors have confirmed through experiments that, when a non-single crystalline Ir-Ta-Al substance other than the specific substances of the present invention is used, the product becomes insufficiently resistant to cavitation and erosion, exhibits poor chemical and electrochemical stabilities, heat resistance, adhesion and internal stress characteristics and the like and does not provide a sufficient durability when cavitation erosion and thermal shock are caused under elevated temperatures or acidic or corrosive conditions. For instance, if excessive Ir is present, the film is removed readily. If excessive Ta and/or Al are present, there is a tendency towards oxidation or erosion.

The foregoing non-single crystalline Ir-Ta-Al substance to be provided by the present invention excels in all-around strength characteristics and therefore, can be effectively used in various applications. For instance, the present invention can be effectively used as a material to coat the surface of a Langmuir probe which is used under severe environmental conditions including high temperature plasma, sudden pressure changes, etc.

Although the specific non-single crystalline Ir-Ta-Al substances according to the present invention are normally used in the form of a single layer structure, they may also be used in the form of a multi-layered structure if desired. Further, with regard to a layer made of the non-single crystalline Ir-Ta-Al substances of the present invention, it is not necessary that the composition of the three elements be uniform over the entire area of the layer. In particular, one or more of the three elements may be distributed non-uniformly in the thicknesswise direction of the layer as long as the composition rate of the elements remains within the specific ranges of the present invention. For example, where a single layer structure comprising the non-single crystalline substance of the present invention is formed on a substrate, adhesion between the layer and the substrate is further improved by distributing Al at a relatively high concentration in the layer region adjacent to the substrate. Similarly, where a two-layered structure comprising two layers, each of which comprises the non-single crystalline Ir-Ta-Al substance of the present invention, is laminated on a substrate, the adhesion between the layer structure and the substrate is enhanced by increasing the concentration of Al in the layer region adjacent to the substrate.

Further, while the surface or inside of a layer occasionally oxidizes upon contact with the atmospheric air or during formation thereof, the effect of such oxidation is minimal. Such oxidation may be of impurities such as 0, C, Si, B, Na, Cl and Fe.

The non-single crystalline substance according to the present invention can be prepared, for example, by a DC sputtering method wherein individual materials accumulate simultaneously, or alternately, by an RF sputtering method, an ion beam sputtering method, a vacuum deposition method, a CVD method, or a film forming method by applying and baking an organic metal-containing paste.

The substrate to be used for forming a member containing the non-single crystalline Ir-Ta-Al substance of the present invention may be selected depending upon the intended use of the device. From the viewpoint of securing the adhesion between the substrate and the non-single crystalline Ir-Ta-Al substance, the selected substrate may comprise at least one of W, Re, Ta, Mo, Os, Nb, Ir, Hf, Ru, Fe, Ni, Co, Cu, Al, stainless steel, or brass.

The present invention is described below with reference to Production Examples 1-21 and Comparative Examples 1-21.

PRODUCTION EXAMPLE 1

A Si single crystalline substrate and another Si single crystalline substrate (each produced by Wacker) having a $SiO_2$ film of 2.5 μm thick formed on the surface thereof were set in position as the substrates 203 for sputtering on the substrate holder 202 in the film forming chamber 201 of the high frequency sputtering apparatus shown in FIG. 2. Sputtering was then performed using a composite target including a Ta sheet 208 and an Ir sheet 207 of a purity higher than 99.9 weight percent placed on an Al target 206 of similar purity to form an alloy layer of about 2,000 Å in thickness under the following conditions.

| Sputtering Conditions: | |
|---|---|
| Target area ratio: | Al:Ta:Ir = 70:12:18 |
| Target area: | 5 inch (127 mm) ϕ |
| High frequency power: | 1,000 W |
| Substrate set temperature: | 50° C. |
| Film forming time: | 12 minutes |
| Base pressure: | $2.6 \times 10^{-4}$ Pa or less |
| Sputtering gas pressure: | 0.4 Pa (argon) |

Further, for the substrate with a $SiO_2$ film on which the alloy layer was formed, the composite target was subsequently replaced by another target made only of Al, and an Al layer to make electrodes 4 and 5 was formed with a layer thickness of 6,000 Å on the alloy layer by an ordinary sputtering method.

Figure 1A:
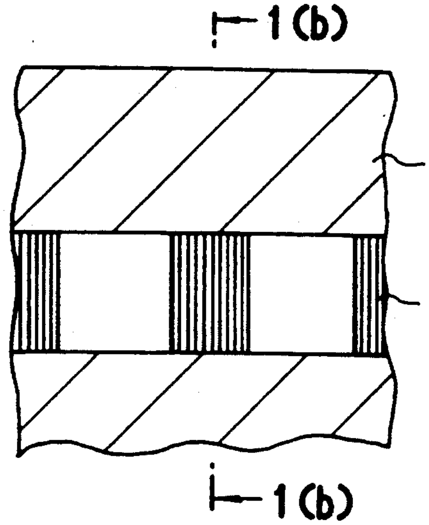
FIG. 1(*a*) is a schematic plan view of the device used for the evaluation of a non-single crystalline substance of the present invention.
Figure 1B:
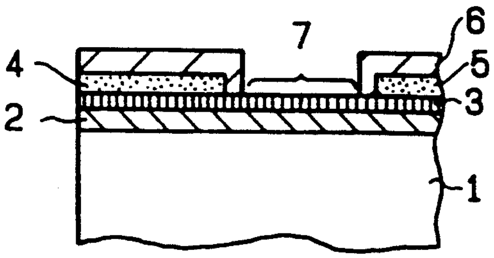
Figure 1C:
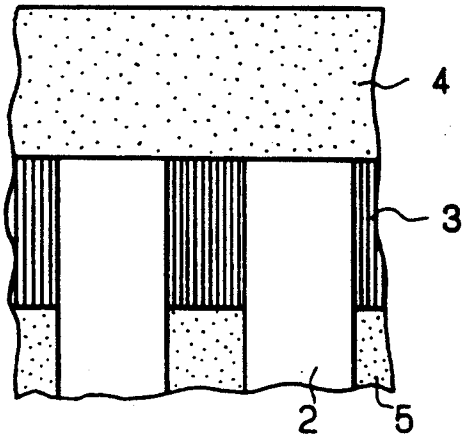

Photoresist was then formed twice in a predetermined pattern by a photo-lithography technique, and the alloy later was dry etched first by wet etching the Al layer and then by ion trimming to form the heat generating resistors 3 and electrodes 4 and 5 shown in FIG. 1(*c*). The size of a heat generating portion was 30 μm×170 μm (at a pitch of heat 125 μm) and a group of 24 heat generating portions was arranged in a row on the substrate.

Subsequently, a $SiO_2$ film was formed on the surface thereof by sputtering, and the $SiO_2$ film was patterned, using a photo-lithography technique and reactive ion etching. Thus, portions 10 μm wide on the opposite sides of the heat generating portions and the electrodes were covered to form a protective layer 6 of the device shown in FIGS. 1(*a*) and 1(*b*). The size of the heat acting portion 7 was 30 μm×150 μm.

Each of the groups was subjected to a cutting operation to produce a plurality of devices, and the following evaluation tests were conducted upon some of them.

(1) Film Composition Analysis

An EPMA (electron probe microanalysis) was conducted for the heat acting portion without a protective film under the following conditions using the measuring instrument described hereinabove to effect a composition analysis.

| | |
|---|---|
| Acceleration voltage | 15 Kv |
| Probe diameter | 10 μm |
| Probe current | 10 Na |

The results of the analysis are shown in Table 1.

It is to be noted that a quantitative analysis was conducted only for the principal components (raw materials) of the targets but not for argon which is also normally taken into a film by sputtering. Further, it was confirmed by simultaneous employment of both a qualitative and a quantitative analysis that other impurity elements in the sample were lower than a detection error (about 0.2 weight percent) of the analyzing apparatus.

(2) Film Thickness Measurement

Measurement of film thickness was conducted by step measurement using an alpha-step 200 contour measuring instrument of the tracer type (by TENCOR INSTRUMENTS).

The results of the measurement are shown in Table 1.

(3) Measurement of Film Crystallinity

An X-ray diffraction pattern was measured using the measuring instrument described above, and the samples were classified into three types including crystalline (C) in which an acute peak by crystal was seen, amorphous (A) which did not provide an acute peak, and mixed (M), wherein crystalline and amorphous are both present in a mixed state.

The results of the measurement are shown in Table 1.

(4) Measurement of Film Density

A variation in weight of the substrate before and after formation of a film was measured using an ultramicro balance produced by INABA SEISAKUSHO LTD., and a density was calculated from a value obtained in the measurement and an area and a thickness of the film. The results are shown in Table 1.

(5) Measurement of Film Internal Stress

Warp was measured for the two elongated glass substrates both before and after film formation. Internal stress was determined by a calculation from such variation and criteria including length, thickness, Young's modulus, Poisson's ratio and film thickness.

The results are shown in Table 1.

(6) Bubble Endurance Test in Low Electric Conductivity Liquid

A device provided with a protective layer 6 was immersed, including the protective layer 6, in the low electric conductivity liquid described below. A rectangular wave voltage (having a width of 7 μsec and a frequency of 5 Khz) was applied from an external power source across the electrodes 4 and 5 while the voltage was gradually raised to obtain a bubble production threshold voltage ($V_{th}$), at which point the liquid starts bubbling.

| Liquid Composition | |
|---|---|
| Water | 70 weight parts |
| Diethylene glycol | 30 weight parts |
| Electric conductivity | 25 μS/cm |

Subsequently, a pulse voltage equal to $1.1\times V_{th}$ was applied to the liquid to repeat production of bubbles and the number of pulses applied was measured until each of the 24 heat acting portions 7 was broken. The average value of the pulses that were applied was calculated (this bubble endurance test in liquid will be hereafter called the "liquid immersion test"). The values obtained are shown in Table 1 (in the column labeled "clear" of the "liquid immersion test" of Table 1) as relative to a reference value provided by an average value of the results of a bubble endurance test conducted in a liquid of low electric conductivity described in Comparative Example 7.

It is to be noted that, since the liquid of the composition described above is low in electric conductivity, the influence of an electrochemical reaction is low, and a principal factor of breakage is thermal shock, cavitation, erosion or the like. Effects upon durability due to these parameters can be determined using the instant test.

(7) Bubble Endurance Test in High Electric Conductivity Liquid

A bubble endurance test was also conducted in a high electric conductivity liquid described below in the same manner as in the case of (6). In this instance, in addition to the number of application pulses until breakage, the variation in resistance of the heat generating portion both before and after application of a pulse signal was measured.

| Liquid Composition | |
|---|---|
| Water | 70 weight parts |
| Diethylene glycol | 29.85 weight parts |
| $CH_3$:COONa | 0.15 weight parts |
| Electric conductivity | 1.0 mS/cm |

The values of the measurement were calculated as average values in the same manner as in (6) described above, and the values obtained were indicated in Table 1 (in the column labeled "black" of the "liquid immersion test"). The values are relative to the reference value provided by an average value of the results of a bubble endurance test conducted in a high electric conductivity liquid described in Comparative Example 7.

It is to be noted that the electrical conductivity of the liquid of the composition described above is sufficiently high that electric current flows in the liquid upon the application of a voltage. Therefore, the instant test discriminates whether or not an electrochemical reaction provides damage to the heat generating portion, in addition to shock or erosion by a cavitation.

Further, the variation in resistance of the heat generating portion allows determining a change in the quality of the non-single crystalline substance due to heat or electrochemical reaction.

(8) Step Stress Test (SST)

A step stress test was conducted in air wherein the pulse voltage was successively increased for a fixed step ($6\times10^5$ pulses, 2 minutes) while similar pulse width and frequency as in (6) and (7) were employed. As a result, the ratio (M) between a break voltage ($V_{break}$) and $V_{th}$ (determined in (6)) was calculated to provide the temperature reached by the heat acting face at $V_{break}$. The results obtained are shown in Table 1. It is to be noted that, these results discriminate a heat resisting property and a thermal shock resisting property of a material in the air.

(9) Total Evaluation

A total evaluation was conducted based on the weighted criteria as described below. These results are shown in Table 1.

⊚: The ratio (relative value) of the result of the endurance test by a liquid immersion test in a low electric conductivity liquid: ≧7, The ratio (relative value) of the result of the endurance test by a liquid immersion test in a high electric conductivity liquid: ≧4, Resistance variation: ≦5%, SST M: ≧1.7.

○: In case where the value of SST M of the evaluation item in the case of ⊚ above is ≧1.55.

Δ: In case where the value of SST M of the evaluation item in the case of ⊚ above is ≧1.50.

X: In the case where any one of the result of the liquid immersion test in a high electric conductivity liquid, the resistance variation and the SST M is evaluated as being lower than Δ in the total evaluation.

PRODUCTION EXAMPLES 2 TO 12 AND 14 TO 19

Devices were produced in the same manner as in Production Example 1, except that the area ratio of individual raw materials of the sputtering target was changed as indicated in Table 1. Analysis and evaluation were conducted with each of the devices in same manner as in Production Example 1. The results obtained are shown in Table 1.

EXAMPLE 13

A device was produced in the same manner as in Production Example 1, except that the film (non-single crystalline substance) obtained in production Example 12 was heated at 1,000° C. for 12 minutes in a nitrogen atmosphere in an infrared ray image furnace to crystallize the same.

Analysis and evaluation were conducted with each of the thus obtained devices in the same manner as in Production Example 1. The results obtained are indicated in Table 1.

EXAMPLE 20

The sputtering apparatus used in Production Example 1 was modified into a film forming apparatus with three target holders in a film forming chamber wherein RF power can be applied independently to each of the target holders. Targets of Al, Ta and Ir (each having a purity of higher than 99.9 weight percent) were mounted on the target holders so that the three metals may be simultaneously sputtered independently of each other. Film formation by multi-dimensional simultaneous sputtering was performed under the conditions described below using substrates similar to those in Production Example 1.

Sputtering conditions

| Target No. | Substance | Applied Power (W) | |
|---|---|---|---|
| 1 | Al | 500 | 500 |
| 2 | Ta | 500 | 1000 |
| 3 | Ir | 500 | 1000 |
| Target area | | Each 5 inches (127 mm) φ | |
| Substrate temperature | | 50° C. | |
| Film forming time | | 6 minutes | |
| Base pressure | | $2.6 \times 10^{-4}$ Pa or less | |
| Sputtering gas pressure | | 0.4 Pa (Ar) | |

The applied voltages to the Ir target and Ta target were increased continuously in a linear function with respect to a film formation time.

Analysis and evaluation similar to those in Production Example 1 were conducted with the thus obtained films. The results obtained are indicated in Table 1. Regarding the film composition, film formation was conducted separately under the fixed conditions while the initial applied power was held constant, or the applied power upon completion was held constant, and quantitative analysis by an EPMA was made in the same manner as in Production Example 1. The results of the analysis are as follows:

In the case where the initial applied voltage was held constant:

$$Al:Ta:Ir=35:26:39 \quad (1)$$

In the case where the applied voltage upon completion was held constant:

$$Al:Ta:Ir=21:32:47 \quad (2)$$

From this, it was presumed that the substrate side region and the surface side region of the formerly obtained film have the compositions of (1) and (2) above, respectively, and that the composition from the substrate side region varies continuously from (1) to (2) through the surface side region. By varying the composition in the thicknesswise direction in this manner, the adhesion of a film to a substrate can be further improved, and the internal stress is controlled desirably.

EXAMPLE 21

Using the same apparatus and film formation processes as in Production Example 20, film formation was performed wherein the applied power was changed as described below. Analysis and evaluation similar to Production Example 1 were conducted with the devices thus obtained and the results obtained are indicated in Table 1.

Applied power conditions

| Target No. | Substance | Applied Power (W) 0 to 3 minutes | Applied Power (W) 3 to 6 minutes |
|---|---|---|---|
| 1 | Al | 500 | 500 |
| 2 | Ta | 500 | 1000 |
| 3 | Ir | 500 | 1000 |

In this instance, a layered film comprising upper and lower layers was obtained, wherein the compositions of the upper layer and the lower layer were different from each other. Further, as Al is contained in a comparatively large amount in the layer region adjacent the substrate, adhesion of the two-layered body to the substrate is assured.

COMPARATIVE EXAMPLES 1 to 6

Devices were produced in the same manner as in Example 1, except that the area ratio of individual raw materials of the sputtering target upon film formation was changed as shown in Table 1.

Analysis and evaluation were conducted with the thus obtained devices in the same manner as in Production Example 1. The results obtained are also indicated in Table 1.

COMPARATIVE EXAMPLE 7

A device was produced in the same manner as in Production Example 1, except that an Al target on which a Ta sheet was provided was used as a sputtering target upon film formation, and the area ratio of the raw materials of the sputtering target was changed as indicated in the column of Comparative Example 7 of Table 2.

Analysis and evaluation were conducted with the thus obtained device in the same manner as in Production Example 1. The results obtained are indicated in Table 2.

The result of the liquid immersion test in Comparative Example 7 was used as a reference value for the results of the liquid immersion tests in other Examples, including the Production Examples and other Comparative Examples. In particular, Table 2 shows that the value of the liquid immersion test in Comparative Example 7 was set to 1 both for the test using low electric conductivity liquid and the test using a high electric conductivity liquid. In Comparative Example 7, the result of the liquid immersion test using a low electric conductivity liquid was about 0.7 times the result obtained using a high electric conductivity liquid.

COMPARATIVE EXAMPLES 8 TO 11

Devices were produced in the same manner as in Production Example 1, except that an Al target on which a Ta sheet was provided was used as the sputtering target upon film formation and the area ratio of the individual raw materials of the sputtering target was varied as indicated in Table 2.

Analysis and evaluation were made with the thus obtained devices in the same manner as in Production Example 1. The results obtained are indicated in Table 3.

COMPARATIVE EXAMPLES 12, 13 AND 14

Devices were produced in the same manner as in Production Example 1, except that an Al target on which an Ir sheet was provided was used as the sputtering target upon film formation and the area ratio of the individual raw materials of the sputtering target was varied as indicated in Table 3.

Analysis and evaluation were made with the thus obtained devices in the same manner as in Example 1. The results obtained are indicated in Table 3.

COMPARATIVE EXAMPLE 15

A device was produced in the same manner as in Production Example 1, except that a Ta target was used as the sputtering target upon film formation.

Analysis and evaluation were made with the thus obtained devices in the same manner as in Production Example 1. The results obtained are indicated in Table 4.

COMPARATIVE EXAMPLES 16 TO 21

Devices were produced in the same manner as in Production Example 1, except that a Ta target on which an Ir sheet was provided was used as the sputtering target upon film formation and the area ratio of the individual raw materials of the sputtering target was varied as indicated in Table 4.

Analysis and evaluation were made with the thus obtained devices in the same manner as in Production Example 1. The results obtained are indicated in Table 4.

TABLE 1

| Example No. Comparative example No. | target area ratio Al | Ta | Ir | film composition (atomic %) Al | Ta | Ir | film thickness Å | crystal-linity | density g/cm² | internal stress kgf/mm² | liquid immersion test clear | black | resistance variation % | M | SST tempera-ture °C. | total evaluation |
|---|---|---|---|---|---|---|---|---|---|---|---|---|---|---|---|---|
| Example | | | | | | | | | | | | | | | | |
| 1 | 70 | 12 | 18 | 45 | 10 | 45 | 3020 | M | 10.8 | −121 | 15 | 5 | 4.0 | 1.77 | 940 | ◎ |
| 2 | 61 | 31 | 8 | 39 | 33 | 28 | 2300 | A | 11.2 | −11 | 7 | 4 | 4.8 | 1.50 | 700 | Δ |
| 3 | 64 | 17 | 19 | 33 | 20 | 47 | 2520 | A | 12.7 | −33 | 19 | 4 | 4.8 | 1.74 | 910 | ◎ |
| 4 | 57 | 30 | 13 | 30 | 35 | 35 | 2270 | A | 12.5 | −3 | 13 | 5 | 4.8 | 1.56 | 730 | ○ |
| 5 | 58 | 20 | 22 | 30 | 18 | 52 | 2450 | M | 14.4 | −162 | 20 | 7 | 4.1 | 1.83 | 1000 | ◎ |
| 6 | 57 | 8 | 35 | 26 | 5 | 69 | 3120 | C | 15.9 | −169 | 19 | 5 | 1.1 | 1.92 | 1110 | ◎ |
| 7 | 45 | 36 | 19 | 17 | 30 | 53 | 2300 | A | 15.2 | −14 | 38 | 12 | 2.9 | 1.88 | 1060 | ◎ |
| 8 | 43 | 25 | 32 | 13 | 31 | 56 | 2420 | M | 15.3 | −15 | 35 | 15 | 2.0 | 1.90 | 1080 | ◎ |
| 9 | 38 | 12 | 50 | 13 | 10 | 77 | 3080 | C | 17.3 | −195 | 30 | 10 | 0.9 | 1.88 | 1060 | ◎ |
| 10 | 45 | 42 | 13 | 12 | 50 | 38 | 2020 | A | 14.4 | −60 | 6 | 4 | 4.5 | 1.55 | 720 | ○ |
| 11 | 44 | 31 | 25 | 8 | 33 | 59 | 2230 | A | 17.4 | −13 | 15 | 6 | 1.0 | 1.85 | 1030 | ◎ |
| 12 | 45 | 36 | 19 | 5 | 41 | 54 | 2070 | A | 16.5 | −26 | 21 | 11 | 4.8 | 1.82 | 990 | ◎ |
| 13 | 45 | 36 | 19 | 5 | 41 | 54 | 2070 | C | 16.8 | −159 | 23 | 12 | 3.5 | 1.86 | 1040 | ◎ |
| 14 | 44 | 38 | 18 | 4 | 45 | 51 | 2170 | A | 16.4 | −11 | 15 | 5 | 4.9 | 1.80 | 970 | ◎ |
| 15 | 38 | 31 | 31 | 4 | 29 | 67 | 2330 | C | 18.0 | −156 | 25 | 8 | 1.2 | 1.90 | 1080 | ◎ |
| 16 | 22 | 13 | 65 | 3 | 7 | 90 | 2750 | C | 19.3 | −189 | 6 | 4 | 0.7 | 1.53 | 750 | Δ |
| 17 | 31 | 50 | 19 | 2 | 48 | 50 | 2230 | A | 16.9 | −38 | 10 | 7 | 3.7 | 1.60 | 720 | ◎ |
| 18 | 34 | 41 | 25 | 2 | 40 | 58 | 2260 | A | 17.7 | −46 | 30 | 12 | 3.4 | 1.80 | 970 | ◎ |
| 19 | 5 | 40 | 55 | 1 | 18 | 81 | 2100 | C | 19.0 | −222 | 8 | 4 | 2.0 | 1.72 | 890 | ◎ |
| 20 | | — | | | — | | 2740 | A | 13.0 | −13 | 17 | 5 | 4.3 | 1.72 | 890 | ◎ |
| 21 | | — | | | — | | 2700 | A | 13.1 | −36 | 15 | 5 | 4.0 | 1.74 | 910 | ◎ |
| Comparative example | | | | | | | | | | | | | | | | |
| 1 | 65 | 29 | 6 | 65 | 18 | 17 | 3650 | A | 7.5 | −9 | 3 | 0.3 | 5.1 | 1.42 | 600 | x |
| 2 | 62 | 30 | 8 | 45 | 35 | 20 | 2280 | A | 9.2 | −32 | 4 | 0 | — | 1.37 | 560 | x |
| 3 | 56 | 38 | 6 | 29 | 63 | 8 | 2020 | A | 11.6 | −55 | 5 | 0 | — | 1.34 | 540 | x |
| 4 | 44 | 50 | 6 | 11 | 68 | 21 | 1980 | A | 13.6 | −83 | 0.0 | 0 | — | 1.40 | 590 | x |
| 5 | 31 | 63 | 6 | 6 | 68 | 26 | 1920 | A | 14.1 | −53 | 5 | 2 | 5.4 | 1.38 | 570 | x |
| 6 | 16 | 4 | 80 | 2 | 3 | 95 | 2980 | C | 20.4 | −212 | 0.2 | 0.2 | 2.0 | 1.52 | 690 | x |

TABLE 2

| Comparative example No. | target area ratio Al | Ta | film composition (atomic %) Al | Ta | film thickness Å | crystal-linity | internal stress kgf/mm² | liquid immersion test clear | black | resistance variation % | M | SST tempera-ture °C. | total evaluation |
|---|---|---|---|---|---|---|---|---|---|---|---|---|---|
| 7 | 65 | 35 | 74 | 26 | 3720 | C | −47 | 1 | 1 | 7.5 | 1.45 | 630 | x |
| 8 | 55 | 45 | 50 | 50 | 2720 | A | −61 | 4 | 2 | 7.2 | 1.40 | 590 | x |
| 9 | 50 | 50 | 45 | 55 | 2520 | A | −21 | 4 | 2 | 9.4 | 1.40 | 590 | x |
| 10 | 40 | 60 | 28 | 72 | 2220 | C | −134 | 5 | 3 | 9.3 | 1.44 | 620 | x |
| 11 | 35 | 65 | 21 | 79 | 2340 | C | −115 | 5 | 2 | 11.3 | 1.35 | 550 | x |

TABLE 3

| Comparative example No. | target area ratio Al | Ir | film composition (atomic %) Al | Ir | film thickness Å | crystal-linity | internal stress kgf/mm² | liquid immersion test clear | black | resistance variation % | M | SST tempera-ture °C. | total evaluation |
|---|---|---|---|---|---|---|---|---|---|---|---|---|---|
| 12 | 84 | 16 | 80 | 20 | 4120 | A | −22 | 0.0 | 0.7 | — | — | — | x |
| 13 | 72 | 28 | 58 | 42 | 3580 | M | −94 | 5 | 0.2 | 5.1 | 1.42 | 600 | x |
| 14 | 68 | 32 | 51 | 49 | 3350 | C | −157 | 0.0 | 0.0 | — | — | — | x |

Note:
The expression "0.0" means a negligible ratio.

TABLE 4

| Comparative example No. | target area ratio Ta | target area ratio Ir | film composition (atomic %) Ta | film composition (atomic %) Ir | film thickness Å | crystal-linity | density g/cm² | internal stress kgf/mm² | liquid immersion test clear | liquid immersion test black | resistance variation % | M | SST tempera-ture °C. | total evaluation |
|---|---|---|---|---|---|---|---|---|---|---|---|---|---|---|
| 15 | 100 | — | 100 | — | 2080 | C | 14.3 | −136 | 0.4 | 0.1 | 8.1 | 1.20 | 430 | x |
| 16 | 94 | 6 | 94 | 6 | 2110 | C | 15.2 | −157 | 4 | 0.1 | 5.7 | 1.34 | 540 | x |
| 17 | 90 | 10 | 87 | 13 | 2120 | C | 16.0 | −155 | 4 | 0.1 | 6.3 | 1.38 | 570 | x |
| 18 | 88 | 12 | 75 | 25 | 2180 | C | 16.7 | −148 | 5 | 0.1 | 5.5 | 1.40 | 590 | x |
| 19 | 86 | 14 | 67 | 33 | 2320 | A | 16.8 | −58 | 5 | 1 | 7.8 | 1.47 | 650 | x |
| 20 | 46 | 54 | 21 | 79 | 2890 | C | 19.0 | −238 | 2 | 1 | 1.7 | 1.52 | 690 | x |
| 21 | 37 | 63 | 12 | 88 | 3020 | C | 19.0 | −210 | film removal was found | | | | | x |

APPLICATION EXAMPLE

In the following is shown an example wherein the Ir-Ta-Al alloy of the present invention was used in a Langmuir probe. The Langmuir probe is an element for measuring various parameters of plasma, including: plasma potential, electron temperature, ion temperature and plasma density by measuring a probe current i (V-i characteristic) upon changing a probe bias voltage V when the Langmuir probe is placed within plasma.

When this element is produced, for instance, in a sputtering film-forming apparatus, technical problems arise since when it is placed within plasma, the element receives sputtered ion impacts (because of an ion sheath in the periphery of the probe, especially in the positive bias region) to raise the temperature of the element which causes a change in its surface quality and a variation in the V-i characteristic. Thus, the reliability of measured data is reduced. Therefore, the probe element is commonly made of a metal having a high melting point such as tungsten. However, even if the probe element is made of tungsten, when it is exposed to reactive materials in a high temperature state in a reduced vacuum region (as in the case of sputtering), its surface quality still changes and moreover, it is still insufficiently resistant to oxidation.

Considering that the Ir-Ta-Al alloy of the present invention excels in chemical stability, heat resistance and adhesion to a base member, such alloy was used in the preparation of a Langmuir probe. Thus, a cylindrical probe body made of tungsten (0.5 mm in diameter and 5.0 mm in length) was provided and a 2000 Å thick film comprising the substance obtained in Production Example 15 was disposed uniformly on the surface thereof by the RF sputtering method.

The probe element thus prepared was set to a vacuum chamber of a sputtering apparatus having the following contents.

| | |
|---|---|
| Target: | Fe (purity: 99.9%) 60 mmϕ |
| Sputtering gas: | Ar (purity: 99.9%) |
| Discharge current: | 1 A |
| Focusing magnetic field: | 500 e |
| Target-substrate distance: | 55 mm |
| The position for the probe element to be placed: | 27.5 mm apart from the surface of the target in the vertical direction |

A Si-single crystal substrate of 35×35 mm in size and 0.5 mm in thickness was positioned in the side of an anode. After vacuum evacuation, plasma discharge was maintained with a Ar gas pressure of 2.0 mTorr and an applied voltage of 1000 V, wherein a plasma potential was measured by a conventional method using the above probe element to obtain a value of Vp=+7V.

Thereafter, the vacuum chamber was restored to atmospheric pressure, and the foregoing procedures of measuring the plasma potential were repeated until the weld time for the probe element became 12 minutes so as to observe a variation in the measured Vp data. It was found that the variation is within the range of 3% and thus, the probe element is sufficiently reliable.

For comparison purpose, a probe element made only of tungsten was provided and the foregoing procedures of measuring the plasma potential were performed using said probe element in the same manner as in the above. The variation in the measured Vp data was larger by as much as 20%.

We claim:

1. A novel non-single crystalline material consisting essentially of Ir, Ta and Al at the following respective composition ranges:

28 atom percent ≦ Ir ≦ 90 atom percent,
5 atom percent ≦ Ta ≦ 65 atom percent, and
1 atom percent ≦ Al ≦ 45 atom percent, whereby said non-single crystalline material exhibits excellent chemical stability, electro-chemical stability, heat resistance, resistance to thermal shock, resistance to cavitation and resistance to erosion.

2. The non-single crystalline material of claim 1 is a polycrystalline material.

3. The non-single crystalline material of claim 1 is an amorphous material.

4. The non-single crystalline material of claim 1 is one comprising a polycrystalline material and an amorphous material in a mixed state.

5. The non-single crystalline material of claim 1 is in a film form.

6. The non-single crystalline material of claim 5 wherein concentrations of the elements being distributed in the film are changed in the thicknesswise direction.

7. The non-single crystalline material of claim 5 wherein the film has a multi-layered structure comprising a plurality of layers being stacked.

8. The non-single crystalline material of claim 5 wherein the thickness of the film is 300 Å to 1 μm thick.

9. The non-single crystalline material of claim 5 wherein the thickness of the film is 1000 Å to 5000 Å thick.

10. A non-single crystalline material consisting essentially of Ir, Ta, and Al at the following respective composition ranges:

35 atom percent ≦ Ir ≦ 85 atom percent,
5 atom percent ≦ Ta ≦ 50 atom percent, and -continued

| |
|---|
| 1 atom percent ≦ Al ≦ 45 atom percent. |

whereby said non-single crystalline material exhibits excellent chemical stability, electro-chemical stability, heat resistance, resistance to thermal shock, resistance to cavitation and resistance to erosion.

11. The non-single crystalline material of claim 10 is a polycrystalline material.

12. The non-single crystalline material of claim 10 is an amorphous material.

13. The non-single crystalline material of claim 10 is one comprising a polycrystalline material and an amorphous material in a mixed state.

14. The non-single crystalline material of claim 10 is in a film form.

15. The non-single crystalline material of claim 14 wherein concentrations of the elements being distributed in the film are changed in the thicknesswise direction.

16. The non-single crystalline material of claim 14 wherein the film has a multi-layered structure comprising a plurality of layers being stacked.

17. The non-single crystalline material of claim 14 wherein the thickness of the film is 300 Å to 1 μm thick.

18. The non-single crystalline material of claim 14 wherein the thickness of the film is 1000 Å to 5000 Å thick.

19. A non-single crystalline material consisting essentially of Ir, Ta, and Al at the following respective composition ranges:

| |
|---|
| 45 atom percent ≦ Ir ≦ 85 atom percent, |
| 5 atom percent ≦ Ta ≦ 50 atom percent, and |
| 1 atom percent ≦ Al ≦ 45 atom percent. |

whereby said non-single crystalline material exhibits excellent chemical stability, electro-chemical stability, heat resistance, resistance to thermal shock, resistance to cavitation and resistance to erosion.

20. The non-single crystalline material of claim 19 is a polycrystalline material.

21. The non-single crystalline material of claim 19 is an amorphous material.

22. The non-single crystalline material of claim 19 is one comprising a polycrystalline material and an amorphous material in a mixed state.

23. The non-single crystalline material of claim 19 is in a film form.

24. The non-single crystalline material of claim 23 wherein concentrations of the elements being distributed in the film are changed in the thicknesswise direction.

25. The non-single crystalline material of claim 23 wherein the film has a multi-layered structure comprising a plurality of layers being stacked.

26. The non-single crystalline material of claim 23 wherein the thickness of the film is 300 Å to 1 μm thick.

27. The non-single crystalline material of claim 23 wherein the thickness of the film is 1000 Å to 5000 Å thick.

28. A member characterized by having a substrate and a coat film disposed on said substrate, said coat film being formed of a non-single crystalline material consisting essentially of Ir, Ta, and Al at the following respective composition ranges:

| |
|---|
| 28 atom percent ≦ Ir ≦ 90 atom percent, |
| 5 atom percent ≦ Ta ≦ 65 atom percent, and |
| 1 atom percent ≦ Al ≦ 45 atom percent, |

whereby said non-single crystalline material exhibits excellent chemical stability, electro-chemical stability, heat resistance, resistance to thermal shock, resistance to cavitation and resistance to erosion.

29. The member according to claim 28, wherein the non-single crystalline material is a polycrystalline material.

30. The member according to claim 28, wherein the non-single crystalline material is an amorphous material.

31. The member according to claim 28, wherein the non-single crystalline material is one which contains a polycrystalline material and an amorphous material in a mixed state.

32. The member according to claim 28, wherein concentrations of the elements being distributed in the film are changed in the thicknesswise direction.

33. The member according to claim 28, wherein the film has a multi-layered structure comprising a plurality of layers being stacked.

34. The member according to claim 28, wherein the film is 300 Å to 1 μm thick.

35. The member according to claim 28, wherein the film is 1000 Å to 5000 Å thick.

36. The member according to claim 28, wherein the substrate is constituted of at least one kind of material selected from the group consisting of W, Re, Ta, Mo, Os, Nb, Ir, Hf, Ru, Fe, Ni, Co, Cu and Al.

37. The member according to claim 28, wherein the substrate is constituted of a stainless steel.

38. The member according to claim 28, wherein the substrate is constituted of a brass.

39. A member characterized by having a substrate and a coat film disposed on said substrate, said coat film being formed of a non-single crystalline material consisting essentially of Ir, Ta, and Al at the following respective composition ranges:

| |
|---|
| 35 atom percent ≦ Ir ≦ 85 atom percent, |
| 5 atom percent ≦ Ta ≦ 50 atom percent, and |
| 1 atom percent ≦ Al ≦ 45 atom percent. |

whereby said non-single crystalline material exhibits excellent chemical stability, electro-chemical stability, heat resistance, resistance to thermal shock, resistance to cavitation and resistance to erosion.

40. The member according to claim 39, wherein the non-single crystalline material is a polycrystalline material.

41. The member according to claim 39, wherein the non-single crystalline material is an amorphous material.

42. The member according to claim 39, wherein the non-single crystalline material is one which contains a polycrystalline material and an amorphous material in a mixed state.

43. The member according to claim 39, wherein concentrations of the elements being distributed in the film are changed in the thicknesswise direction.

44. The member according to claim 39, wherein the film has a multi-layered structure comprising a plurality of layers being stacked.

45. The member according to claim 39, wherein the film is 300 Å to 1 μm thick.

46. The member according to claim 39, wherein the film is 1000 Å to 5000 Å thick.

47. The member according to claim 39, wherein the substrate is constituted of at least one kind of material selected from the group consisting of W, Re, Ta, Mo, Os, Nb, Ir, Hf, Ru, Fe, Ni, Co, Cu and Al.

48. The member according to claim 39, wherein the substrate is constituted of a stainless steel.

49. The member according to claim 39, wherein the substrate is constituted of a brass.

50. A member characterized by having a substrate and a coat film disposed on said substrate, said coat film being formed of a non-single crystalline material consisting essentially of Ir, Ta, and Al at the following respective composition ranges:

| |
|---|
| 45 atom percent ≦ Ir ≦ 85 atom percent, |
| 5 atom percent ≦ Ta ≦ 50 atom percent, and |
| 1 atom percent ≦ Al ≦ 45 atom percent. |

whereby said non-single crystalline material exhibits excellent chemical stability, electro-chemical stability, heat resistance, resistance to thermal shock, resistance to cavitation and resistance to erosion.

51. The member according to claim 50, wherein the non-single crystalline material is a polycrystalline material.

52. The member according to claim 50, wherein the non-single crystalline material is an amorphous material.

53. The member according to claim 50, wherein the non-single crystalline material is one which contains a polycrystalline material and an amorphous material in a mixed state.

54. The member according to claim 50, wherein concentrations of the elements being distributed in the film are changed in the thicknesswise direction.

55. The member according to claim 50, wherein the film has a multi-layered structure comprising a plurality of layers being stacked.

56. The member according to claim 50, wherein the film is 300 Å to 1 μm thick.

57. The member according to claim 50, wherein the film is 1000 Å to 5000 Å thick.

58. The member according to claim 50, wherein the substrate is constituted of at least one kind of material selected from the group consisting of W, Re, Ta, Mo, Os, Nb, Ir, Hf, Ru, Fe, Ni, Co, Cu and Al.

59. The member according to claim 50, wherein the substrate is constituted of a stainless steel.

60. The member according to claim 50, wherein the substrate is constituted of a brass.

* * * * *

UNITED STATES PATENT AND TRADEMARK OFFICE
CERTIFICATE OF CORRECTION

PATENT NO. : 5,234,774
DATED : August 10, 1993
INVENTOR(S) : KENJI HASEGAWA, ET AL.

It is certified that error appears in the above-identified patent and that said Letters Patent is hereby corrected as shown below:

ON TITLE PAGE

[57] ABSTRACT should read as follows:

--A non-single crystalline material contains Ir, Ta and Al at the following respective composition rates:

28 atom percent ≦ Ir ≦ 90 atom percent;
5 atom percent ≦ Ta ≦ 65 atom percent; and
1 atom percent ≦ Al ≦ 45 atom percent.

A member is also provided which has a substrate and a film of the non-single crystalline material disposed thereon.--.

COLUMN 1

Line 51, "Ta-AI" should read --Ta-Al--.

COLUMN 7

Line 8, "0," should read --O,--.
Line 62, "later" should read --layer--.

COLUMN 9

Line 54, "$CH_3$:COONa" should read --$CH_3COONa$--.

COLUMN 10

Line 18, "that," should read --that--.
Line 55, "production" should read --Production--.

UNITED STATES PATENT AND TRADEMARK OFFICE
CERTIFICATE OF CORRECTION

PATENT NO. : 5,234,774

DATED : August 10, 1993

INVENTOR(S) : KENJI HASEGAWA, ET AL.

It is certified that error appears in the above-identified patent and that said Letters Patent is hereby corrected as shown below:

COLUMN 15

Line 65, "a" should read --an--.

COLUMN 16

Line 29, "novel" should be deleted.
Line 30, "Ta" should read --Ta,--.

Signed and Sealed this

Third Day of May, 1994

Attest:

Bruce Lehman

BRUCE LEHMAN

Attesting Officer

Commissioner of Patents and Trademarks